Patented Dec. 13, 1949

2,490,937

UNITED STATES PATENT OFFICE 2,490,937

AMINOALKYL-PHENYL LACTONES

Arthur W. Weston, Waukegan, Ill., assignor to Abbott Laboratories, Chicago, Ill., a corporation of Illinois No Drawing. Application August 17, 1945,
Serial No. 611,261

6 Claims. (Cl. 260—344)

This invention relates generally to therapeutic substances and more specifically to lactones (organic compounds) which are useful as antispasmodics and the intermediates for preparing those compounds.

Example I

α-(2-diethylaminoethyl)-α-phenylvalerolactone

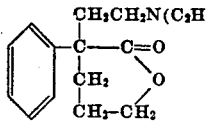

22 g. of α-(2-diethylaminoethyl)-benzyl cyanide is converted to its sodium salt by treatment with an ether suspension of 3.0 g. of sodamide. After the addition of 21.5 g. of 3-phenoxypropyl bromide, the mixture is refluxed and stirred several hours. The ether layer is washed with water and then extracted with dilute acid. Addition of aqueous alkali to these acidic extracts regenerates the free base which is taken up by ether. Removal of the ether leaves an oil from which any unreacted starting material is removed by heating to 200° C. at 3 mm. pressure. The residual oil consisting mainly of α-(2-diethylaminoethyl)-α-(3-phenoxypropyl)-benzyl cyanide is refluxed several hours with 200 cc. of 48% hydrobromic acid. The resulting solution is evaporated to dryness, then stirred on the steam bath with chloroform and excess phosphorous oxychloride. The solvent and excess reagent are removed and cold aqueous alkali added which liberates the base. This is extracted with ether. The extracts are concentrated and the residue distilled. The product thus obtained boils at 169°–171° C. at 3 mm. and has $n_D^{23}$ 1.5037.

Example II

α-(2-diethylaminoethyl)-α-phenylbutyrolactone

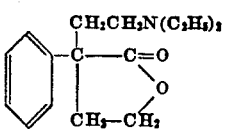

25 g. of α-(2-hydroxyethyl)-benzyl cyanide is refluxed and stirred four hours with 200 cc. of ether containing a suspension of sodamide prepared from 7.8 g. of sodium metal. The 2-diethylaminoethyl chloride, obtained from 34 g. of the corresponding hydrochloride, is then added and the mixture stirred and refluxed several hours. The basic fraction obtained as described in the previous example is subjected to distillation. The α-(2-hydroxyethyl)-α-(2-diethylaminoethyl)-benzyl cyanide has boiling point 187°–190° C. at 3–4 mm., and $n_D^{25}$, 1.5127.

After refluxing 14.1 g. of this nitrile with 100 cc. of 48% hydrobromic acid for several hours, the solution is evaporated to dryness on the steam bath. Excess thionyl chloride is then added. The mixture is heated to remove the excess of the reagent, then cooled and stirred with ice and ether. The aqueous extracts are made alkaline and the liberated base dissolved in ether. The ether extracts are concentrated and the residue distilled. The product boils at 161°–163° C. at 2–3 mm. and has $n_D^{25.5}$, 1.5203.

All of the lactones which are not quaternary ammonium salts are usually more soluble in water as salts than as the free bases and are therefore, administered as water soluble salts when rapid effect is desired. The salts may be formed by allowing equivalent amounts of the lactone and the desired acidic material to react in the presence of a suitable organic solvent. Any acid which produces a water-soluble salt and does not appreciably enhance the toxicity is suitable for use. Such acids as sulphuric, phosphoric, hydrochloric, levulinic, mucic, acetic and tartaric acid are among those which are satisfactory. The salts produced by combination of these lactones with certain other non-toxic acids, such as tannic acid, are very sparingly soluble in water. These sparingly soluble compounds, as well as the free bases, may be administered when the pharmacological effect desired should be slow in onset and relatively long in duration. Where any lactone which does not contain a quarternary ammonium group is mentioned in the following claims, it is intended to include both the free base and the salts.

Example III

Quaternary ammonium salts of the lactones already mentioned may be produced by mixing the lactones with a slight excess of an alkyl halide, a dialkyl ester of sulphuric acid, or alkyl esters of sulphonic acids. The two substances may be mixed with or without the addition of an appropriate organic solvent.

α-(2-diethylaminoethyl)-α-phenylbutyrolactone methiodide

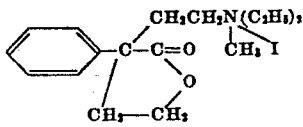

Two grams of α-(2-diethylaminoethyl)-α-phenylbutyrolactone and 1.4 grams of methyl iodide were mixed. The reaction proceeds spontaneously with generation of considerable heat, such that external cooling of the container is desirable. The crystalline product separates on standing.

Without further elaboration, the foregoing will so fully explain my invention, that others may readily adapt the same for use under various conditions of service. For instance, this work has established that the desired therapeutic activity is primarily associated with a lactone ring having a side chain containing an amino group, and those skilled in this art will be aware that the phenyl group of the specific examples given may be replaceable by a wide variety of other groups, either aromatic or aliphatic. The length of the alkyl groups may also be varied, and branched chains of carbon atoms used instead of straight chains. In the above formulas the $CH_2$ groups in the lactone ring may be represented as $(CH_2)x$, where $x$ is a small whole number from 2 to 4 inclusive.

I claim:

1. Aminoalkyl-phenyl lactones represented by the formula

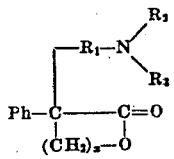

where Ph represents a phenyl group, $R_1$ represents a lower alkyl group, $R_2$ and $R_3$ are selected from the group consisting of hydrogen and lower alkyl groups, and $x$ represents a number selected from the group consisting of 2 and 3, and acid addition salts thereof.

2. The process of preparing an aminoalkyl-phenyl lactone compound of claim 1, which comprises reacting an α-(aminoalkyl)-benzyl cyanide with an alkali metal to form the corresponding α-alkali metal salt, reacting the resulting alkali metal salt with a phenoxy-alkyl halide, hydrolyzing the resulting α-(aminoalkyl)-α-(phenoxyalkyl)-benzyl cyanide to convert the phenoxy group to an hydroxy group and the cyanide group to a carboxyl group, and condensing said hydroxyl and carboxyl groups to form the lactone ring.

3. The process of preparing an aminoalkyl-phenyl lactone compound of claim 1, which comprises reacting an α-(hydroxyalkyl)-benzyl cyanide with an alkali metal to form the corresponding α-alkali metal salt, reacting the resulting alkali metal salt with an aminoalkyl halide, hydrolyzing the resulting α-(hydroxyalkyl)-α-(aminoalkyl)-benzyl cyanide to convert the cyanide group to a carboxyl group, and condensing said carboxyl group with the hydroxyl group of said hydroxyalkyl group to form the lactone ring.

4. The compound α-(2-diethylamino ethyl)-α-phenylvalerolactone represented by the formula:

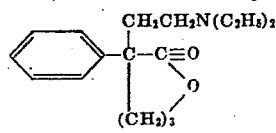

5. The compound α-(2-diethylaminoethyl)-α-phenylbutyrolactone represented by the formula

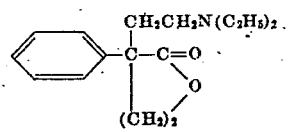

6. Compounds of the formula:

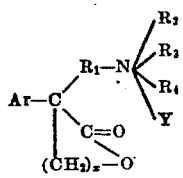

where Ar is an aryl group, $R_1$ is an aliphatic group, $R_2$, $R_3$ and $R_4$ are selected from the class consisting of hydrogen and alkyl groups, Y is a halogen atom and $x$ is a small whole number.

ARTHUR W. WESTON.

REFERENCES CITED

The following references are of record in the file of this patent:

UNITED STATES PATENTS

| Number | Name | Date |
| --- | --- | --- |
| 2,166,487 | Felix et al. | July 18, 1939 |
| 2,187,847 | Andersog | Jan. 23, 1940 |
| 2,421,729 | Walton et al. | June 3, 1947 |

FOREIGN PATENTS

| Number | Country | Date |
| --- | --- | --- |
| 663,375 | Germany | Aug. 4, 1938 |